3,038,939
DIETHYLAMINES
Karl Klager, 321 W. Palm, Monrovia, Calif.
No Drawing. Filed Jan. 30, 1957, Ser. No. 637,332
2 Claims. (Cl. 260—583)
(Granted under Title 35, U.S. Code (1952), sec. 266)

The invention described herein may be manufactured and used by or for the Government of the United States of America for government purposes without the payment of any royalties thereon or therefor.

This application is a continuation-in-part of applicant's copending application Serial No. 331,517, filed January 15, 1953, now abandoned, for Diethylamines. That application in turn was a division of applicant's copending application Serial No. 258,976, filed November 29, 1951, now abandoned, for Diethylamines and Process for Preparing Same.

This invention relates to new diethylamines and to a process for the preparation thereof. Specifically, these new compounds may be represented by the following structural formula:

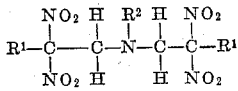

in which $R^1$ is ordinarily hydrogen but may be a member of the group including bromine, fluorine, and chlorine. $R^2$ represents a member of the group including hydrogen, amino, alkyl, aralkyl, and aryl. The compounds are usually prepared in the form of salts in which case the member of the group represented by $R^1$ is replaced by a member of the group including sodium or potassium which is associated with one of the two nitro groups connected to each terminal carbon atom. As examples of diethylamines coming within the scope of the above formula there may be mentioned the following: potassium salts of 2,2,2′,2′-tetranitrodiethylamine, N-amyl-2,2,2′,2′-tetranitrodiethylamine, N-butyl-2,2,2′,2′-tetranitrodiethylamine, and phenyl-2,2,2′,2′-tetranitrodiethylamine; 2,2′-dibromo-2,2,2′,2′-tetranitrodiethylamine, and the like.

One object of the invention is to provide a process for the production of tetranitrodiethylamines and derivatives thereof. Another object is to provide a process for reacting potassium dinitroethanol with amines under moderate, controlled conditions. A further object is to provide new nitro compounds. Further objects will appear hereinafter.

Prior to the instant invention, investigators in this field found that alcohols would react with ammonia or amines under drastic conditions to form substituted amines. It has been discovered that potassium dinitroethanol reacts readily with ammonia or amines in aqueous solution at moderate temperatures and at atmospheric pressure. The yields are nearly quantitative. Potassium dinitroethanol undergoes reaction with ammonia to yield dipotassium 2,2,2′,2′-tetranitrodiethylamine having the following structure:

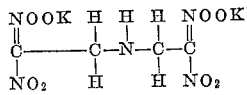

With primary amines, for example, n-butylamine, amylamine, or aniline, crystalline potassium salts are obtained having the following structures:

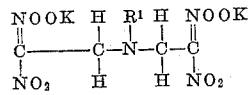

where $R^1$ represents an alkyl, aryl or aralkyl group. Temperatures ranging from 20° to 85° C. may conveniently be employed. In the majority of instances, however, it will be found desirable to effect such reaction at temperatures of from 50° to 75° C. The compounds produced in this manner may be purified by recrystallization from a suitable solvent, such as, for example, acetone, methanol, or ethanol.

The dinitroethanol contemplated by the invention is represented, in the form of the potassium salt, by the following formula:

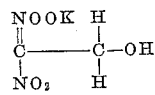

It will be evident that the potassium associated with the nitro group may be replaced by hydrogen, bromine, or chlorine attached directly to the adjacent carbon atom without change in the essential properties of the compound.

Primary amines that can be utilized in the reaction constitute any of such compounds included by the general formula:

in which $R^1$ represents either hydrogen, amino, substituted amino, alkyl, aryl, and aralkyl groups. Examples of such compounds are ammonia, hydrazine, substituted hydrazines, amylamine, butylamine, aniline, and the like.

The examples which follow are illustrative of the various types of tetranitrodiethylamines that come within the scope of the invention. They are likewise illustrative of the procedures whereby these new chemical compounds may be synthesized. However, it is to be specifically understood that such examples in no way limit the scope of the invention with respect to the process demonstrated therein, since it has been found that the reaction involved is general in nature and will occur under the conditions set forth when reacting substantially any primary amine of the various types enumerated above, with a nitroethanol of the class described.

*Example I*

40 gm. potassium dinitroethanol was suspended in a mixture of 50 ml. $H_2O$ and 25 ml. ammonia. After heating for two hours at 60°–75° C. the mixture was cooled to 0° C., and the precipitated yellow crystals were filtered off. The yield was 25 gm. of potassium 2,2,2′,2′-tetranitrodiethylamine.

*Example II*

300 gm. of potassium dinitroethanol was dissolved in 375 ml. $H_2O$ and 125 ml. ammonia at 60° C. and maintained for four hours at 55–60° C. with stirring. After about three hours of stirring a yellow precipitate was formed. After cooling to 10° C. and filtering, 135 gm. wet dipotassium 2,2,2′,2′-tetranitrodiethylamine was obtained.

*Example III*

23.3 gm. potassium 2,2,2′,2′-tetranitrodiethylamine was suspended in 120 gm. ice and 80 ml. $H_2O$, and 6 ml. bromine was added at 0° C. dropwise with good agitation. The color of the reaction mixture changed from yellow to brown. The white precipitate was filtered and washed with water. The yield was 21.8 gm. of 2,2′-dibromo-2,2,2′,2′-tetranitrodiethylamine after crystallization from hexane. The melting point of the white needles was 66–68° C.

*Example IV*

40 gm. potassium dinitroethanol was suspended in 66 ml. water and 14.6 gm. amylamine was added at 50° C.

to the mixture. After about 10 minutes of heating the salt disappeared. The stirring was continued for an additional two hours. The mixture was then cooled to room temperature and filtered. After washing with ice water, 42 gm. of dipotassium N-amyl-2,2,2′,2′-tetranitrodiethylamine in the form of yellow crystals was obtained. The crystals are soluble in methanol, acetone and ethanol.

*Example V*

40 gm. potassium dinitroethanol and 66 ml. water were heated to 55° C. and 13.4 gm. n-butylamine was dropped into the mixture. After 10 minutes the salt was completely dissolved. The stirring was continued for an additional three hours. After cooling to room temperature, the precipitate was filtered and washed with water. The yield was 65.5 gm. of dipotassium N-n-butyl-2,2,2′,2′-tetranitrodiethylamine in the form of yellow crystals soluble in alcohol and acetone.

*Example VI*

40 gm. potassium dinitroethanol and 84 ml. water were heated to 50° C. and 14 gm. aniline was dropped into the suspension. After 10 minutes of stirring at 50–55° C. a red solution was obtained which was stirred at the same temperature for an additional two and one-half hours. After cooling the mixture to room temperature, the crystals were filtered off and washed with water. Red brown crystals of dipotassium phenyl-2,2,2′,2′-tetranitrodiethylamine were obtained.

The highly nitrated compounds resulting from the above described process are valuable explosives since they have a favorable oxygen balance, are relatively stable, form uniform crystals, and are smokeless.

The compounds of this invention are useful as high explosives can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162 is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact or time fuse-mechanism firing a detonating explosive such as lead azide or mercury fulminate.

Obviously many modifications and variations of the present invention are possible in the light of the above teachings. It is therefore to be understood that within the scope of the appended claims the invention may be practiced otherwise than as specifically described.

What is claimed is:

1. Tetranitrodiethylamines having the formula:

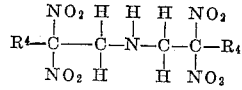

wherein $R^4$ is a member selected from the group consisting of chlorine, bromine and fluorine.

2. 2,2′-dibromo-2,2,2′,2′-tetranitrodiethylamine.

References Cited in the file of this patent

UNITED STATES PATENTS 2,731,460   Schenck et al. _____ Jan. 17, 1956

FOREIGN PATENTS 315,593   Switzerland _____ Oct. 15, 1956

OTHER REFERENCES

Fieser et al.: Organic Chemistry, 2nd edition, D. C. Heath & Co., Boston, page 640 (1950).

Johnson: Jour. Amer. Chem. Soc., vol. 68 (1946), pages 12–14. (Available in Library.)